United States Patent
Head et al.

(10) Patent No.: US 6,510,961 B1
(45) Date of Patent: Jan. 28, 2003

(54) INTEGRALLY-REINFORCED BRAIDED TUBULAR STRUCTURE AND METHOD OF PRODUCING THE SAME

(75) Inventors: Andrew Atkins Head, Cincinnati, OH (US); John William Peter, Loveland, OH (US)

(73) Assignee: A&P Technology, Covington, KY (US)

( * ) Notice: Subject to any disclaimer, the term of this patent is extended or adjusted under 35 U.S.C. 154(b) by 0 days.

(21) Appl. No.: 09/292,070

(22) Filed: Apr. 14, 1999

(51) Int. Cl.⁷ .............................................. B65D 90/00
(52) U.S. Cl. ...................................... 220/645; 220/590
(58) Field of Search ................................ 220/645, 592, 220/590, 62.19

(56) References Cited

U.S. PATENT DOCUMENTS

| | | | | |
|---|---|---|---|---|
| 3,124,001 A | * | 3/1964 | Conley | 220/590 X |
| 3,412,891 A | * | 11/1968 | Bastone et al. | 220/645 |
| 3,580,289 A | | 5/1971 | James et al. | 138/121 |
| 3,586,058 A | | 6/1971 | Ahrens et al. | 138/103 |
| 3,661,294 A | * | 5/1972 | Pearson et al. | 220/590 X |
| 3,765,557 A | | 10/1973 | Giwer | 220/3 |
| 3,851,786 A | * | 12/1974 | Kaempen | 220/590 X |
| 3,886,980 A | | 6/1975 | Elson | 138/127 |
| 4,257,527 A | * | 3/1981 | Snyder et al. | 220/673 X |
| 4,380,252 A | | 4/1983 | Gray et al. | 138/125 |
| 4,494,436 A | | 1/1985 | Kruesi | 87/23 |
| 4,519,290 A | | 5/1985 | Inman et al. | 87/7 |
| 4,728,059 A | | 3/1988 | Stephen et al. | 244/119 |
| 4,778,075 A | * | 10/1988 | Wiegand et al. | 220/645 |
| 4,846,908 A | | 7/1989 | Aldrich et al. | 156/148 |
| 5,227,208 A | * | 7/1993 | Thongs, Jr. | 220/590 X |
| 5,259,901 A | | 11/1993 | Davis et al. | 156/154 |
| 5,375,735 A | * | 12/1994 | Huvey et al. | 220/62.19 X |
| 5,443,499 A | | 8/1995 | Schmitt | 623/1 |
| 5,462,191 A | * | 10/1995 | Bartlow et al. | 220/645 X |
| 5,772,938 A | * | 6/1998 | Sharp | 220/590 X |
| 5,816,426 A | * | 10/1998 | Sharp | 220/590 X |

* cited by examiner

Primary Examiner—Steven Pollard
(74) Attorney, Agent, or Firm—Darby & Darby (57) ABSTRACT

A method of producing a generally tubular, reinforced, structure including an inner layer of braided material having a predefined indentation configuration, the method including the steps of providing a mandrel having a shape and configuration of indentations corresponding to the shape and indentation configuration of the inner layer, providing a plurality of support members in the vicinity of at least some of the indentations on the mandrel, the support members protruding a predetermined distance radially outwardly from the mandrel, depositing the inner layer over the mandrel and the support members, and removing the support members to a position in which the support members do not protrude the surface of the mandrel.

46 Claims, 9 Drawing Sheets

INTEGRALLY-REINFORCED BRAIDED TUBULAR STRUCTURE AND METHOD OF PRODUCING THE SAME

FIELD OF THE INVENTION

The present invention relates to braided structures and braiding techniques in general and, more particularly, to braided reinforcement of generally tubular structures.

BACKGROUND OF THE INVENTION

Tubular composite parts that are repeatedly subjected to moderate to high stress and/or pressure levels, for example, fuel tanks, jet engine parts and airplane fuselages, must be structurally reinforced to provide reliable, safe operation at all design load conditions. Typically, such parts are constructed from a number of elements or subassemblies which are reinforced at various locations using reinforcement members that are typically attached to the parts using adhesive bonding or mechanical fasteners such as rivets or bolts. This reinforcement method is generally reliable; however, the reinforcement members and attachment means add undesired weight to the reinforced parts and increase production costs. This problem is particularly significant in airplane parts, where weight, cost and safety are critical considerations for design and manufacture.

Braid-reinforced structures of various shapes and forms are known in the art. For example, braid-reinforced tubular structures are used in the composites industry for recreational equipment, e.g., snow boards, baseball bats and tennis rackets. Braid-reinforced tubular structures are also used in prosthetic devices, aerospace parts, e.g., vanes and bushings, and other products requiring a relatively strong, light weight construction, for example, light poles. Such tubular structures are typically formed by mounting pre-braided sleevings over mandrels having the desired shapes of the finished products. The braided structure is placed in a tool or die cavity and resin is introduced into the braid using well known methods, such as resin transfer, gravity feeding or resin film infusion. Finally the parts are consolidated and/or cured, in a heated mold, oven or autoclave, typically under vacuum or pressure conditions.

SUMMARY OF THE INVENTION

It is an object of the present invention to provide a braid-reinforced, generally tubular, structure for use in generally tubular parts, particularly parts designed to endure medium to high stress and/or pressure levels, for example, pressurized vessels and airplane parts such as fuel tanks, jet engine parts and fuselage.

It is another object of the present invention to provide a method of manufacturing a braid-reinforced, generally tubular, structure.

It is yet another object of the present invention to provide a braid-reinforced, generally tubular, structure having a predefined configuration of indentations thereon.

In accordance with an embodiment of the present invention, there is provided a method of producing a braid-reinforced, generally tubular structure, the structure including an inner layer having a predefined indentation configuration, the method including:

providing a mandrel having a shape and configuration of indentations corresponding to the shape and indentation configuration of said inner layer;

providing a plurality of support members along at least some of the indentations of said mandrel, the support members protruding a predetermined distance radially outwards from the surface of the mandrel;

forming an inner layer braid surrounding the mandrel and the support members thereon; and removing the support members from their protruding positions along at least some of the indentations.

To remove the support members from the vicinity of the indentations, the support members may be detached from the mandrel or retracted into a non-protruding position, e.g., into the interior of the mandrel.

In some embodiments of the present invention, the method further includes the step of over-braiding the inner layer of the generally tubular structure with at least one additional braided layer, thereby to provide further reinforcement. Additionally, preformed reinforcement or stiffener members may be installed on the inner layer, along the locations of the indentations on the mandrel, before the inner layer is overbraided with the at least one outer layer. The preformed reinforcement or stiffener members may be pre-shaped to conform to the shape of the indentations in the surface of the mandrel, so as to force the inner layer into contact with the surface of the mandrel within the indentations.

The use of the support members in forming the braided structure results in a braid which is larger in diameter than the mandrel in the vicinity of the indentations. Once the inner layer braid is pushed into the indentations of the mandrel, e.g., by the preformed reinforcement members and over-braiding described above, the excess amount of braided material in the vicinity of the indentations enables the inner layer to adapt to the shape of the indentations in the surface of the mandrel. By controlling the dimensions of the support members and/or the reinforcement members, the inner layer of the braided structure can be adapted to fit the shape of the mandrel with a desired degree of stretching.

In a preferred embodiment of the present invention, the method further includes the step of curing the braid-reinforced, generally tubular structure to provide added reinforcement and rigidity to the structure.

In accordance with an embodiment of the present invention, there is also provided a braid-reinforced, generally tubular structure including an inner braided layer having a predefined configuration of indentations. The braid-reinforced tubular structure may further include at least one outer braided layer. In some embodiments, the braid-reinforced, generally tubular structure includes a plurality of reinforcement or stiffener members disposed in the spaces defined between the outer layer and the inner layer. The reinforcement or stiffener members may include axial and/or circumferential reinforcement members and/or reinforcement members at any other predefined angle.

In one embodiment of the invention, the generally tubular object includes at least a portion of a pressurized vessel, such as a fuel tank. In another embodiment of the invention, the generally tubular object includes at least a portion of a fuselage. In yet another embodiment of the invention, the generally tubular object includes at least a portion of a jet engine part, for example an exhaust shroud or a duct.

BRIEF DESCRIPTION OF THE DRAWINGS

The present invention will be better understood from the following detailed description of preferred embodiments of the invention taken in conjunction with the following drawings of which.

DETAILED DESCRIPTION OF A PREFERRED EMBODIMENT

Figure 1A:
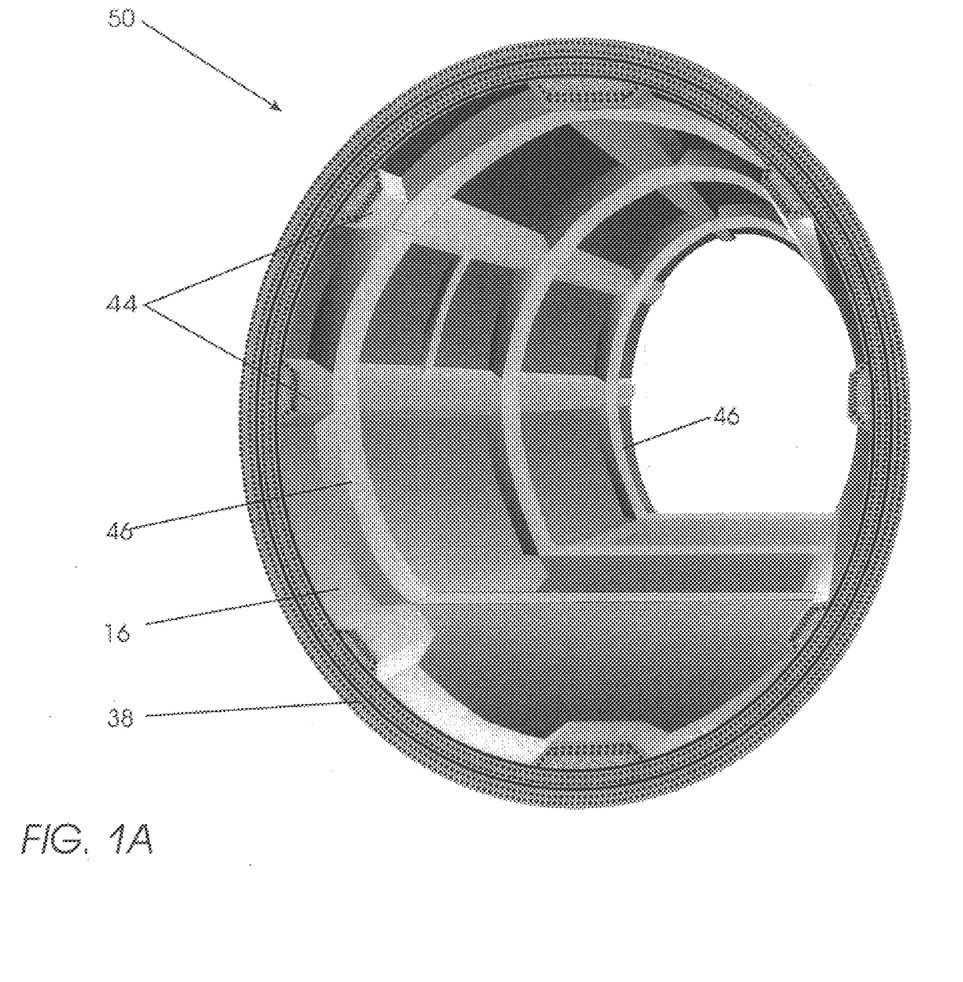
FIG. 1A is a schematic, perspective, illustration of part of a braid-reinforced tubular structure in accordance with an embodiment of the present invention.
Figure 1B:
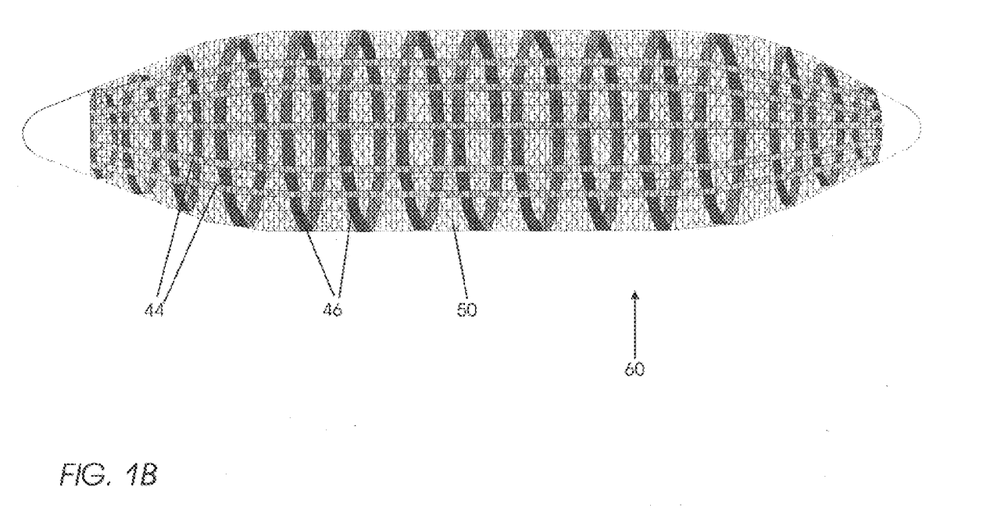
FIG. 1B is a conceptual, perspective view of a vessel incorporating a braid-reinforced tubular structure in accordance with an embodiment of the present invention.

Reference is made to FIG. 1A which schematically illustrates part of a braid-reinforced tubular structure 50 in accordance with an embodiment of the present invention, and to FIG. 1B which conceptually illustrates a vessel 60 incorporating braid-reinforced structure 50. Vessel 60 may be a pressurized vessel such as a fuel tank. It should be appreciated that the use of braid-reinforced tubular structures in accordance with the present invention is not limited to pressurized vessels such as vessel 60 in FIG. 1B, and that such tubular structures may also be used in various other applications, for example, as part of an airplane fuselage or for jet engine parts such exhaust shrouds or ducts, as well as in various ground or sea applications.

In accordance with the invention, the shape of tubular structure 50 is not limited to be generally cylindrical. Rather, structure 50 may take various shapes and forms, for example, structure 50 may be conical or of any other generally tubular shape with a varying radius.

Braid-reinforced tubular structure 50 includes a plurality of reinforcement elements, for example, a plurality of axial reinforcement elements 44 and a plurality of circumferential reinforcement elements 46. In other embodiments of the present invention, the braid-reinforced structure may include other reinforcement configurations, for example, angled (e.g., diagonal) reinforcement elements, or any other configuration of reinforcement elements, depending on specific applications of the invention. For simplicity of explanation, the invention is described below with reference to the non-limiting example of axial and circumferential reinforcement only.

As shown in FIG. 1A, braid-reinforced structure 50 includes an inner braided layer 16 and an outer braided layer 38. The formation of layers 16 and 38 and reinforcement elements 44 and 46 is described in detail below. It will be appreciated by persons skilled in the art that reinforcement elements 44 and 46, when formed as described below, add considerable strength to the braid-reinforced structure 50 without substantially increasing the weight of the structure. It will be understood by persons skilled in the art that inner braided layer 16 and outer braided layer 38 may consist of any number of braided sub-layers or plies, depending on specific applications, and that the term "layer" is not intended to be limited to single-layered structures.

Figure 2A:
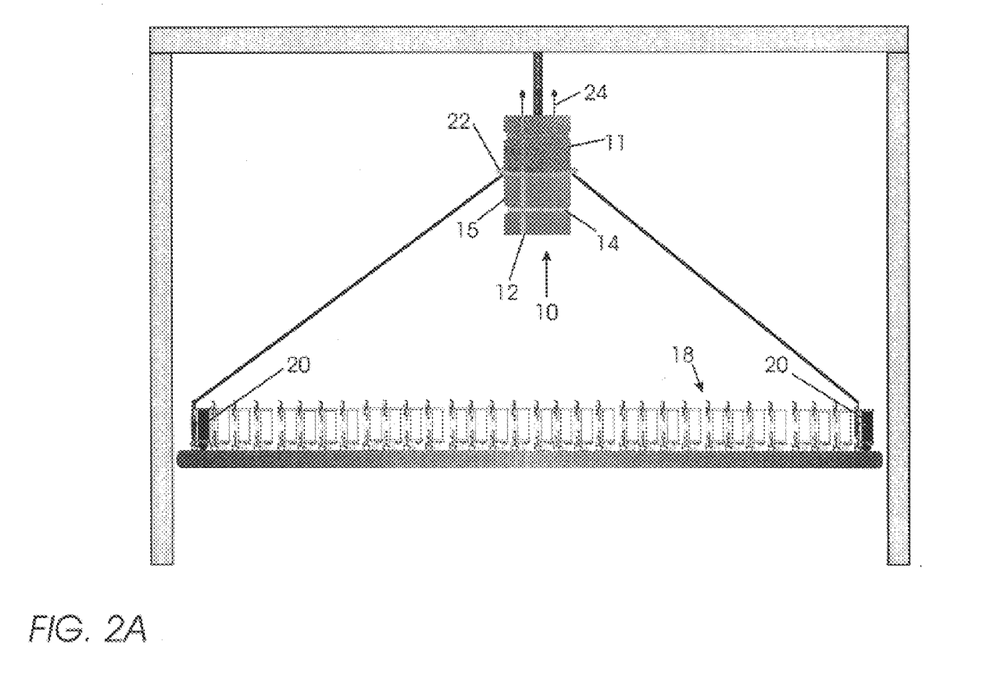
FIG. 2A is a schematic, side-view, illustration of apparatus for depositing a tubular braid over a mandrel in accordance with an embodiment of the present invention.
Figure 2B:
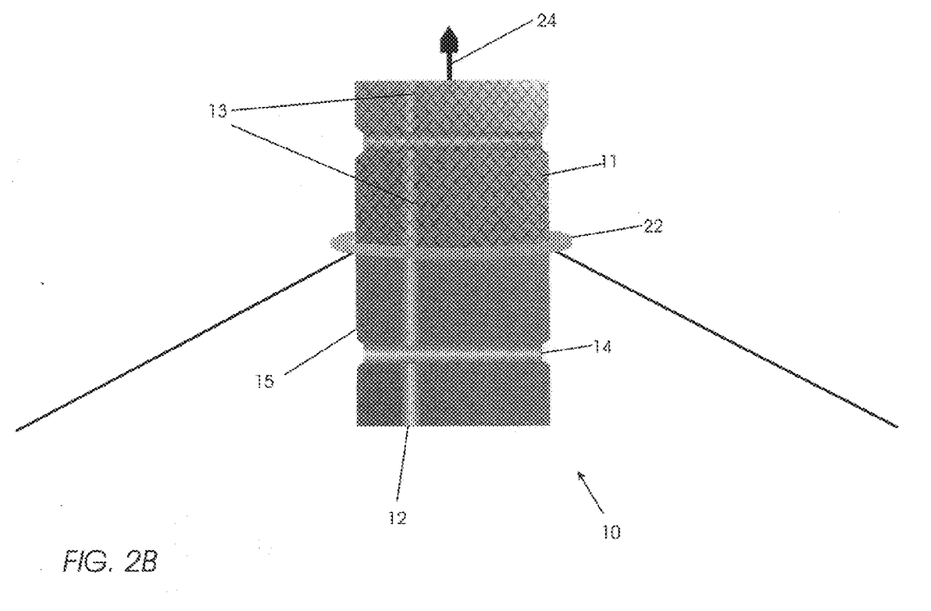
FIG. 2B is a schematic, side-view, illustration of part of the apparatus of FIG. 2A, showing deposition of a tubular braid over a mandrel having a predefined indentation configuration.

Reference is now made also to FIG. 2A, which schematically illustrates a side-view of a braid deposition apparatus for depositing tubular braids over a mandrel in accordance with an embodiment of the present invention, and to FIG. 2B which illustrates part of the apparatus of FIG. 2A. The braiding apparatus includes a mandrel 10 (shown more clearly in FIG. 2B) having a surface 15 which is shaped, using methods as are known in the art, to have an indentation configuration including a plurality of axial indentations 12 and a plurality of circumferential indentations 14. Each axial indentation 12 includes a plurality of axial indentation segments 13, defined between cross-points of the axial indentation with circumferential indentations 14. The indentation configuration on the surface of mandrel 10 provides a preform lay-up surface corresponding to an inner layer 16 of a braid-reinforced tubular structure, such as the vessel reinforcement structure 50 shown in FIGS. 1A and 1B.

The braid deposition apparatus further includes a braiding machine 18 having a plurality of circumferential spaced apart dispensing members 20, for dispensing a predetermined braid configuration, e.g., a triaxial tubular braid, as is known in the art. The braid dispensed by machine 18 is deposited on mandrel 10 via a deposition hoop 22 surrounding the mandrel, to form a layer 11 of the braided material around mandrel 10 as mandrel 10 advances in the direction indicated by arrows 24. Mandrel 10 may be advanced through hoop 22 using any means known in the art, for example, a motor-driven linear displacement device (not shown).

In some embodiments of the present invention (not shown in the drawings), braiding machine 18 further includes means for vibrating the braiding material, as it is being dispensed. Such vibration ensures uninterrupted flow of the braiding material and minimizes breakage of yarns due to surface friction, even when depositing large diameter braids. Braiding machines using vibrating means to improve yarn flow are known in the art and are described, for example, in U.S. Pat. No. 4,785,709 to Freitas.

It will be appreciated by persons skilled in the art that the invention is not limited to the use of braiding machine 18 as described herein, and that any suitable braiding machine, as is known in the art, may be used for depositing the braiding material onto mandrel 10.

Figure 3A:
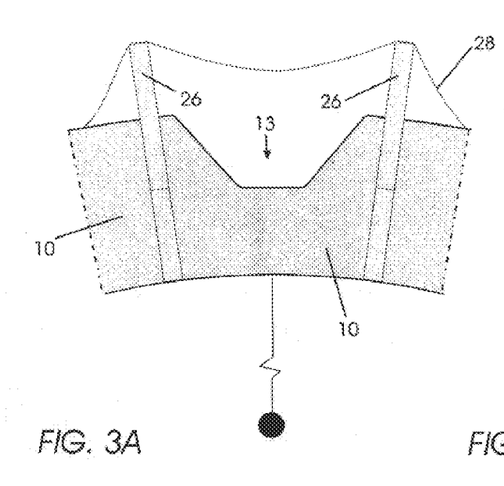
FIGS. 3A and 3B are schematic, cross-sectional, top-view and side view illustrations, respectively, of part of the mandrel of FIGS. 2A and 2B, in preparation for braid deposition in accordance with an embodiment of the present invention.
Figure 3B:
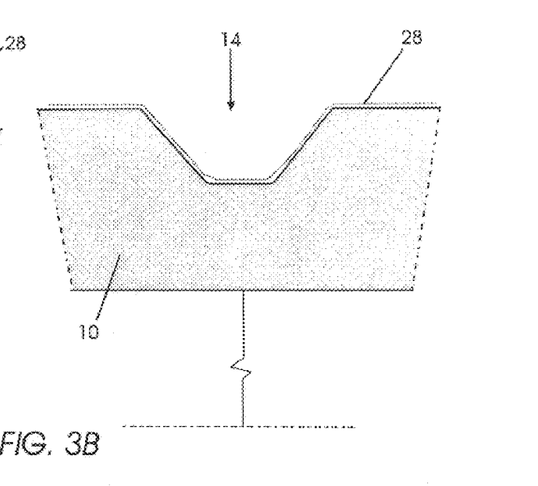

Reference is now made also to FIGS. 3A and 3B which schematically illustrate a cross-sectional top view and side view, respectively, of a portion of mandrel 10 in preparation for braid deposition in accordance with an embodiment of the present invention. As shown in FIG. 3A, mandrel 10 is provided with axial support members, e.g., a plurality of retractable slats 26, which protrude radially outward a predetermined distance from surface 15 of mandrel 10. Slats 26 may be installed on either or both sides of axial indentations 12, along some or all of segments 13. The function of slats 26 is described in detail below. Prior to deposition of any braided material, surface 15 of mandrel 10 may be covered with vacuum bagging material 28, which is subsequently used to assist in separating structure 50 from mandrel 10, as described in detail below.

Figure 4A:
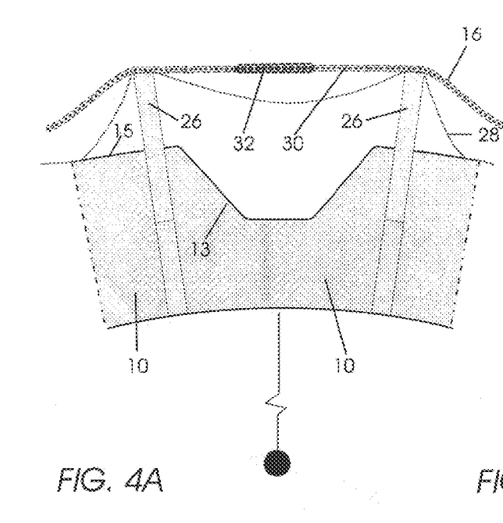
FIGS. 4A and 4B, are schematic, cross-sectional, top view and side view illustrations, respectively, of part of the mandrel of FIGS. 2A and 2B, during formation of an inner layer of the braid-reinforced tubular structure of FIG. 1A.
Figure 4B:
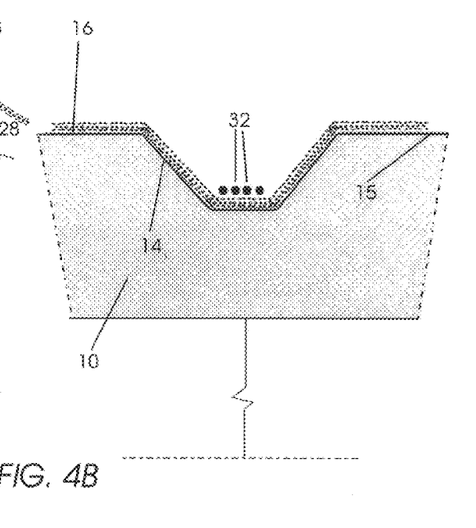

Reference is now made to FIGS. 4A and 4B which schematically illustrate a cross-sectional top view and side view, respectively, of part of mandrel 10 with axial support members 26 in a protruding position, during deposition of inner layer 16 of braid-reinforced tubular structure 50 in accordance with an embodiment of the present invention. After slats 26 are placed in the desired positions along segments 13 of indentations 12 and are optionally covered with bagging material 28, mandrel 10 is braided with inner layer 16 which may consist of a tubular triaxial braid. As shown in FIG. 4B, the braided material is directly deposited onto the mandrel surface along circumferential indentations 14. Along segments 13 of axial indentation 12, in contrast, the braided material bridges across retractable slats 26, resulting in regions of excess braiding material 30 in the vicinity of segments 13, i.e., regions 30 are circumferentially larger than the width of segments 13.

In an embodiment of the present invention, the height of retractable slats 26, i.e., the extent to which slats 26 protrude surface 15, is selected such that the path length of regions 30 over indentation segments 13 is slightly shorter than the circumferential path length along the surface of the respective indentation segments 13. The slight difference in path length between regions 30 and indentation 13 results in a predetermined degree of circumferential elongation of inner layer 16, caused by a change in the fiber geometry in regions 30, when inner layer 16 is forced to conform to the shape of indentation segments 13 as described below. This results in a certain degree of debulk, i.e., elongation of the braided layer, which minimizes or prevents the formation of wrinkles in the braided structure, thereby maintaining structural strength. Debulking of braided structures, prior to curing, is known in the art and is typically performed by applying pressure to elongate the braid and reduce its thickness, thereby minimizing the formation of wrinkles during curing.

Optionally, after or during deposition of inner layer 16 (FIG. 4A), regions 30 may be loaded with a higher density of braiding material 32, e.g., axial yarns, for increased structural efficiency. This can be achieved by introducing a predetermined number of axial yarns at the locations of indentations 12, during deposition of the triaxial braid forming inner layer 16, thereby providing additional reinforcement along indentations 12. Similarly, in some embodiments of the invention, unidirectional braiding material 32 may be introduced along circumferential indentations 14.

Figures 5A, 5B:
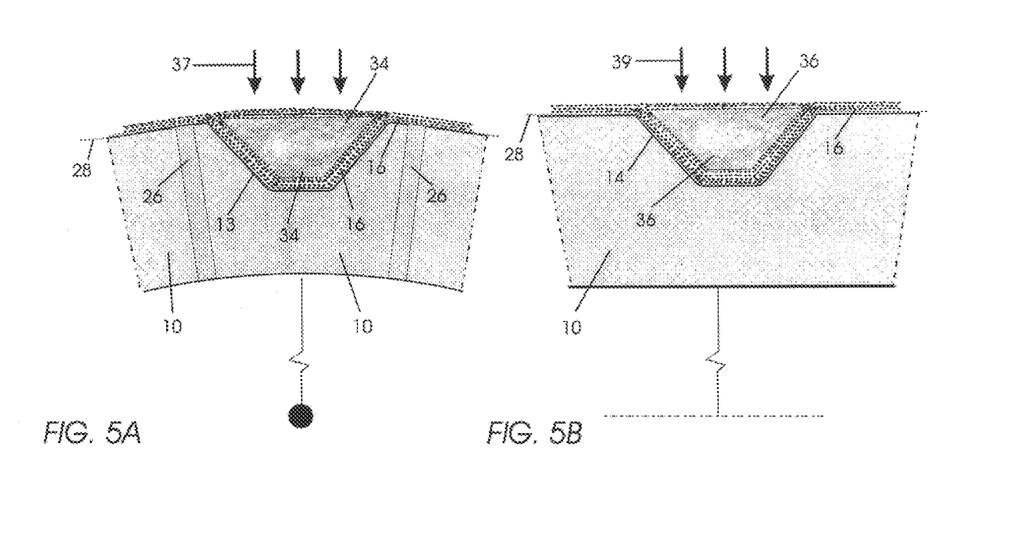
FIGS. 5A and 5B are schematic, cross-sectional, top view and side view illustrations, respectively, of part of the mandrel of FIGS. 2A and 2B, during installation of axial and circumferential reinforcement members of the braid-reinforced tubular structure of FIG. 1A.

Reference is now made to FIGS. 5A and 5B which schematically illustrate a cross-sectional top view and side view, respectively, of part mandrel 10, after installation of axial reinforcement members 34 and circumferential reinforcement elements 36 of braid-reinforced tubular structure 50 in accordance with an embodiment of the present invention. Reinforcement members 34 and 36, also referred to herein as cores 34 and 36, are pre-formed to have a desired cross-section, preferably in a shape corresponding to the shape of indentations 12 and 14, respectively.

In an embodiment of the present invention, cores 34 and 36 include braid-reinforced structures which may be produced using any method known in the art, for example, preformed foam cores, as described below.

By applying radially inward forces in the directions indicated by arrows 37 and 39, reinforcement members 34 and 36 may be installed into axial indentations 12 and circumferential indentations 14, respectively. Before installing reinforcement members 34, the slats 26 which protrude on either side of each indentation segment 13 are retracted, e.g., into the interior of mandrel 10, as shown in FIG. 5A. Alternatively, slats 26 may be completely removed, i.e., separated, from mandrel 10. The slats may be removed one set at a time, either manually or using an automated procedure, depending on the specific application and the cost-efficiency of designing and implementing an automated removal procedure. After the slats are retracted or otherwise removed, members 34 are forcefully pushed in the direction of arrow 37 forcing the excess material in regions 30 of layer 16 into contact with the surface of axial indentation segments 13.

Circumferential reinforcement cores 36 may be readily installed over layer 16 in respective circumferential indentations 14, by pushing the cores in the direction indicated by arrows 39, because support slats 26 do not interfere with circumferential indentations 14 and because layer 16 is already in contact with the surface of indentations 14. Installation of circumferential cores 36 may be performed before or after installation of axial cores 34; however, in the embodiment described herein, it is generally preferred to first install all of axial cores 34 because they provide support for correctly positioning cores 36. Circumferential reinforcement cores 36 are preferably formed of a relatively flexible material which enables curving around the circumference of mandrel 10. Alternatively, cores 36 may be relatively rigid and preformed to have a curved shape corresponding to the radius of curvature of mandrel 10. It will be understood, however, that the invention is not limited to any particular shape of reinforcement cores 34 and 36, or to any particular order of installation of the cores.

Cores 34 and 36 may be formed of any suitable materials as are known in the art. Different materials may be used for the two types of cores or the same material can be used, depending on specific applications. In some embodiments of the invention, the material forming cores 34 and 36 may include foams used in aerospace applications, for example, cured polyurethane or vinyl based foams, honeycomb structures (e.g., aluminum or Nomex® honeycomb structures), or any suitable combination of honeycomb structures and cured foams. In some embodiments of the invention, cores 34 and 36 may be strengthened by over-braiding the foam structure.

Figure 6A:
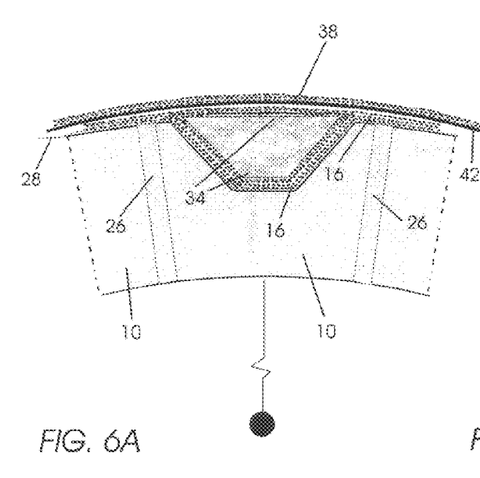
FIGS. 6A and 6B are schematic, cross-sectional, top view and side view illustrations, respectively, of part of the mandrel of FIGS. 2A and 2B, during over-braiding of an outer layer of the braid-reinforced tubular structure of FIG. 1A.
Figure 6B:
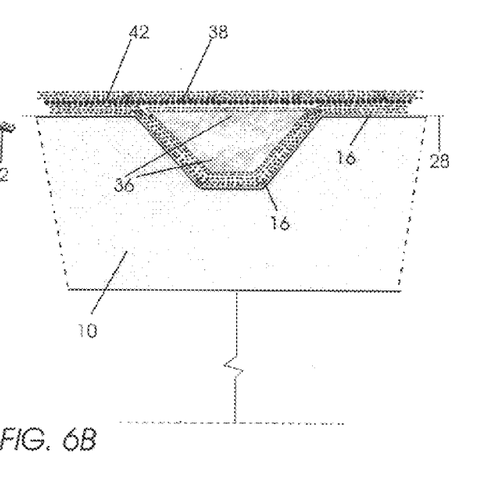

Reference is now made to FIGS. 6A and 6B which schematically illustrate a cross-sectional top view and side view, respectively, of part of mandrel 10 during over-braiding outer layer 38 of braid-reinforced tubular structure 50. After reinforcement members 34 and 36 are securely placed in respective indentations 12 and 14, outer layer 38 may be over-braided on the entire structure. In some embodiments of the present invention, prior to the deposition of outer layer 38, a circumferentially-wrapped fiber layer 42 may be deposited, circumferentially, over inner layer 16 and reinforcement members 34 and 36. This provides radially inward pressure which stabilizes structure 50, particularly in the vicinity of reinforcement elements 44 and 46 (FIG. 1A). Outer layer 38 preferably includes a triaxial braid which may be interspersed to a predetermined degree in accordance with specific structural strength requirements. In an embodiment of the invention, outer layer 38 may include aerospace-grade carbon fibers, as are known in the art, which may be deposited, for example, in a triaxial-braid configuration of 0° axial fibers and about ±60° bias fibers. The same material and deposition configuration may be used for inner layer 16. Aerospace-grade carbon fibers may also be used as the material for circumferentially-wrapped fiber layer 42.

Figure 7A:
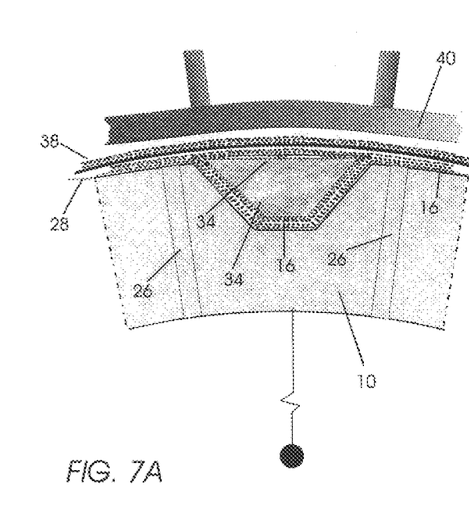
FIGS. 7A and 7B are schematic, cross-sectional, top view and side view illustrations, respectively, of part of the mandrel of FIGS. 2A and 2B used in conjunction with an external curing mold, during curing of the braid-reinforced tubular structure of FIG. 1A.
Figure 7B:
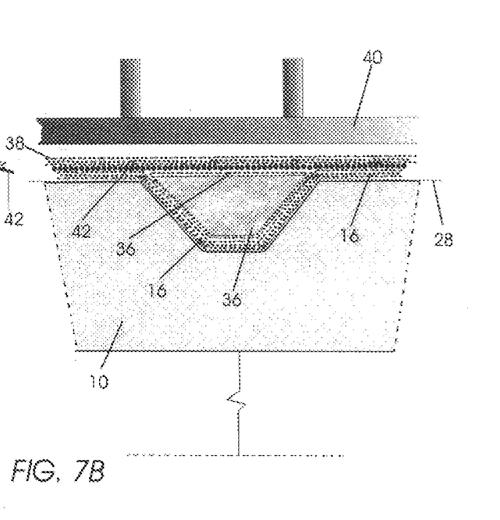

FIGS. 7A and 7B schematically illustrate a cross-sectional top view and side view, respectively, of part of mandrel 10 used in conjunction with an external curing mold 40, e.g., a female cure tool, for curing of braid-reinforced tubular structure 50 in accordance with an embodiment of the present invention. After forming braid- reinforced tubular structure 50, as described above, the integrally formed structure is brought into operative engagement with curing mold 40 which applies heat and/or pressure to cure (i.e., stiffen) structure 50, as described below. As is known in the art, resin-impregnated fibers may be included in the braided structure, prior to curing, or resin may be introduced using resin infusion methods as are known in the art. In an alternative embodiment of the invention, structure 50 may be cured by resin transfer molding (RTM) or resin injection molding, as is known in the art.

Before curing, optional vacuum bag 28 may be sealed to mandrel 10, to separate structure 50 from mandrel 10. This may be performed, for example, by applying a vacuum at the surface of mold 40 to pull structure 50 towards mold 40. The vacuum applied by mold 40 may debulk structure 50, allowing the structure to separate from mandrel 10 and to adhere to mold 40. This enables convenient removal of mandrel 10 after curing of structure 50.

Curing of structure 50 may be performed using any suitable method, as is known in the art, for example, using an autoclave cure process. Vacuum bag 28 may be utilized throughout the curing process. To prevent compaction and damaging of the cured structure 50 during autoclave cool-down, the cured structure 50 is preferably removed from mold 40 while it is still hot.

Feasibility studies have been performed to demonstrate the producibility of a reinforced tubular structure in accordance with the present invention. For the purpose of these studies, a mandrel with axial and circumferential indentations and retractable slats as described above was constructed in a shape corresponding to a 25% downscaled representation of an integrally stiffened fuselage structure. A triaxial overbraid was deposited on the mandrel to form an inner layer of the structure. Then, the slats on the mandrel were retracted and reinforcement members were inserted into the axial and circumferential indentations. The structure was completed by depositing an outer layer consisting of a 0°+/−60° triaxial overbraid, including carbon fibers as are know in the art.

It will be appreciated by persons skilled in the art that the scope of the present invention is not limited to the specific embodiments of the invention described herein with reference to the accompanying drawings. Rather, the scope of the present invention is limited only by the following claims.

What is claimed is:

1. A braid-reinforced, generally tubular, structure comprising:
   an interior;
   at least one reinforcement layer, said reinforcement layer including braided material and at least one indentation, said indentation including a recess in the direction of the interior of the structure and said braided material contacting said recess; and
   a plurality of reinforcement members in said indentation.

2. A vessel adapted to endure pressure and including a braid-reinforced structure according to claim 1.

3. A fuel tank including a braid-reinforced structure according to claim 1.

4. An airplane fuselage including a braid-reinforced structure according to claim 1.

5. A jet engine part including a braid-reinforced structure according to claim 1.

6. An exhaust shroud including a braid-reinforced structure according to claim 1.

7. A braid-reinforced structure according to claim 1 wherein said indentation includes one of a generally axial indentation, a generally circumferential indentation and a Generally angled indentation.

8. The braid-reinforced structure according to claim 1 further including an outer layer.

9. A braid-reinforced, generally tubular, structure comprising:
   an interior; and
   at feast one reinforcement layer, said reinforcement layer including braided material and at least one indentation, said indentation including a recess in the direction of the interior of the structure and said braided material contacting said recess.

10. The braid-reinforced structure according to claim 9 further including an outer layer.

11. The braid-reinforced structure according to claim 9 further comprising said braided material being seamless.

12. The braid-reinforced structure according to claim 11 further comprising said reinforcement layer being seamless.

13. The braid-reinforced structure according to claim 11 further comprising said braided material being manufactured to conform to said recess.

14. The braid-reinforced structure according to claim 11 further comprising said braided material being a triaxial braid.

15. A braid-reinforced, generally tubular, structure comprising:
   an interior; and
   at least one reinforcement layer, said reinforcement layer including braided material and a plurality of indentations, each of said indentations including a recess in the direction of the interior of the structure and said braided material contacting said recess.

16. The braid-reinforced structure according to claim 15 wherein said plurality of indentations includes one of at least two generally axial indentations, at least two generally circumferential indentations and at least two generally, angled indentations.

17. The braid-reinforced structure according to claim 15 wherein said plurality of indentations includes at least two generally axial indentations and at least two generally circumferential indentations.

18. The braid-reinforced structure according to claim 15 further including an outer layer.

19. A vessel adapted to endure pressure and including a braid-reinforced structure according to claim 15.

20. A fuel tank including a braid-reinforced structure according to claim 15.

21. An airplane fuselage including a braid-reinforced structure according to claim 15.

22. A jet engine part including a braid-reinforced structure according to claim 15.

23. An exhaust shroud including a braid-reinforced structure according to claim 15.

24. An duct including a braid-reinforced structure according to claim 15.

25. The braid-reinforced structure according to claim 9 further comprising said braided material being manufactured to conform to said recess.

26. The braid-reinforced structure according to claim 25 further comprising a plurality of indentations, said indentations including a generally axial indentation and a generally circumferential indentation.

27. The braid-reinforced structure according to claim 9 further comprising said recess including walls and a surface area of said walls, the gap between opposing sides of the recess at the level of said reinforcement layer which is non-recessed having an area, and said recess walls surface area being larger than said non-recessed area.

28. The braid-reinforced structure according to claim 27 further comprising said braided material being inextensible.

29. The braid-reinforced structure according to claim 9 further comprising said braided material being inextensible.

30. The braid-reinforced structure according to claim 9 wherein said indentation includes one of a generally axial indentation, a portion of a generally axial indentation, a generally circumferential indentation, a portion of a generally circumferential indentation, a generally angled indentation and a portion of a generally angled indentation.

31. The braid-reinforced structure according to claim 30 further comprising a plurality of indentations, said indentations including at least a generally axial indentation and a generally circumferential indentation.

32. A braid reinforced, generally tubular structure comprising:

a mandrel including at least one indentation, said indentation including a recess in the direction of the interior of the mandrel; and at least one reinforcement layer deposited on said mandrel, said reinforcement layer including a braided material contacting said recess.

33. The braid-reinforced structure according to claim 32 further comprising said reinforcement layer being seamless.

34. The braid-reinforced structure according to claim 32 further comprising said braided material being manufactured to conform to said recess.

35. The braid-reinforced structure according to claim 32 further comprising said braided material being a triaxial braid.

36. The braid-reinforced structure according to claim 32 further comprising said recess including walls and a surface area of said walls, the gap between opposing sides of the recess at the level of said reinforcement layer which is non-recessed having an area, and said recess walls surface area being larger than said non-recessed area.

37. The braid-reinforced structure according to claim 32 further comprising said braided material being inextensible.

38. The braid-reinforced structure according to claim 32 wherein said indentation includes one of a generally axial indentation, a portion of a generally axial indentation, a generally circumferential indentation, a portion of a generally circumferential indentation, a generally angled indentation and a portion of a generally angled indentation.

39. The braid-reinforced structure according to claim 32 further comprising a plurality of indentations, said indentations including at least a generally axial indentation and a generally circumferential indentation.

40. A braid reinforced generally tubular structure having an inner layer constructed according to the following process:

providing a mandrel having a shape and configuration of indentations corresponding to the shape and indentation configuration of said inner layer;

providing a plurality of support members in the vicinity of at least some of the indentations on said mandrel, the support members protruding a predetermined distance radially outwardly from said mandrel;

depositing said inner layer over said mandrel and said support members; and removing said support members to a position in which the support members do not protrude above the surface of the mandrel.

41. A braid reinforced generally tubular structure according to claim 40 wherein the process of construction further comprises after depositing said inner layer, installing a plurality of reinforcement members over said inner layer along the indentations of said mandrel.

42. A braid reinforced generally tubular structure according to claim 41 wherein the process of construction further comprises after installing said plurality of reinforcement members, depositing an outer layer over both the inner layer and the reinforcement layers.

43. A braid reinforced generally tubular structure according to claim 40 wherein said indentation configuration includes a plurality of generally axial indentations and a plurality of generally circumferential indentations.

44. The braid-reinforced structure according to claim 9 further comprising said braided material being a triaxial braid.

45. The braid-reinforced structure according to claim 1 further comprising said structure having one of a conical, generally tubular with a varying radii, non-conical and non-tubular shape.

46. An duct including a braid-reinforced structure according to claim 1.

\* \* \* \* \*